US011471758B2

(12) United States Patent
Onitsuka et al.

(10) Patent No.: US 11,471,758 B2
(45) Date of Patent: *Oct. 18, 2022

(54) ILLUMINATION DEVICE AND GAME MACHINE

(71) Applicant: OMRON Corporation, Kyoto (JP)

(72) Inventors: Hiroyuki Onitsuka, Kani (JP);
Takahiro Ono, Ichinomiya (JP);
Tatsuya Adachi, Ichinomiya (JP); Rei Asai, Ichinomiya (JP); Takehiro Agata, Ichinomiya (JP)

(73) Assignee: OMRON Corporation, Kyoto (JP)

( * ) Notice: Subject to any disclaimer, the term of this patent is extended or adjusted under 35 U.S.C. 154(b) by 2 days.

This patent is subject to a terminal disclaimer.

(21) Appl. No.: 17/126,650

(22) Filed: Dec. 18, 2020

(65) Prior Publication Data

US 2021/0228980 A1 Jul. 29, 2021

(30) Foreign Application Priority Data

Jan. 24, 2020 (JP) .............................. JP2020-010133

(51) Int. Cl.
*A63F 13/26* (2014.01)
*F21V 8/00* (2006.01)

(52) U.S. Cl.
CPC ............ *A63F 13/26* (2014.09); *G02B 6/0036* (2013.01); *G02B 6/0053* (2013.01); *G02B 6/0068* (2013.01)

(58) Field of Classification Search
CPC ..... A63F 13/26; G02B 6/0036; G02B 6/0053; G02B 6/0068
USPC .......................................................... 463/31
See application file for complete search history.

(56) References Cited

U.S. PATENT DOCUMENTS

| 7,220,181 B2 * | 5/2007 | Okada ................. G07F 17/3211 463/31 |
| 2005/0230233 A1 | 10/2005 | Hoehne et al. |
| 2013/0135560 A1 | 5/2013 | Lee et al. |
| 2015/0247966 A1 | 9/2015 | Kim |
| 2015/0346420 A1 * | 12/2015 | Niu ........................... G06T 1/20 362/606 |
| 2016/0306098 A1 | 10/2016 | Fujta et al. |

FOREIGN PATENT DOCUMENTS

JP 2016-206240 A 12/2016

OTHER PUBLICATIONS

The Office Action dated Apr. 21, 2022 in a related U.S. Appl. No. 17/121,857.

* cited by examiner

*Primary Examiner* — Andrew J Coughlin
*Assistant Examiner* — Jessica M Apenteng
(74) *Attorney, Agent, or Firm* — Metrolex IP Law Group, PLLC

(57) ABSTRACT

An illumination device according to one or more embodiments may include: a light guide plate unit having a front light guide plate and a rear light guide plate; a light projecting unit having an LED configured to supply light to the front light guide plate and the rear light guide plate; a moving mechanism configured to cause the light guide plate unit to reciprocate in a depth direction; and a detector having a detection region in front of the light guide plate unit in the depth direction and configured to detect the presence or absence of an object without contacting. The moving mechanism may move the light guide plate unit in accordance with a detection result of the detector.

10 Claims, 11 Drawing Sheets

ILLUMINATION DEVICE AND GAME MACHINE

CROSS-REFERENCE TO RELATED APPLICATION

The present application is based on and claims priority to Japanese Patent Application No. 2020-010133 filed with the Japan Patent Office on Jan. 24, 2020, the entire contents of which are incorporated herein by reference.

BACKGROUND

The disclosure relates to an illumination device that is suitably mounted on a game machine.

In game facilities such as casinos, multiple game machines such as slot machines made by various game machine makers are installed, and a player selects a favorite game machine to play a game. Therefore, the game machines need to have appeal that attracts player's interest and make them want to play the game.

In order to attract player's interest, an illumination device is mounted on the game machines. Examples of the illumination device include a technique of causing light emitted from a light source to be incident on a light incident surface of an end surface of a light guide plate to propagate inside, and reflecting the light with a prism provided on a back surface of the light guide plate and emitting the light from a front surface of the light guide plate serving as a light exit surface. As an illumination device provided in a game machine using such a technique, the applicant of this application also has proposed and applied for a patent for a display device in which a plurality of light guide plates are arranged in a depth direction (JP 2016-206240 A).

Although JP 2016-206240 A described above is intended to perform light presentation using a light guide plate, there is room for further improvement over just switching a lighting pattern of the light guide plate in order to attract player's interest.

SUMMARY

An illumination device according to one or more embodiments may realize an illumination device that is more appealing and attracting players.

An illumination device according to one or more embodiments may include: a light guide plate unit having a light guide plate configured to emit, from a light exit surface, light incident inside from a light incident surface; a light projecting unit having an optical element configured to supply light to the light guide plate; a moving mechanism configured to cause the light guide plate unit to reciprocate in a depth direction; a detector having a detection region in front of the light guide plate unit in the depth direction and configured to detect presence or absence of an object without contacting; and a base configured to support the light guide plate unit, the light projecting unit, the moving mechanism, and the detector. The moving mechanism moves the light guide plate unit in accordance with a detection result of the detector.

According to the above described configuration, the detector may detect the presence or absence of an object in front of the light guide plate unit in the depth direction, and the moving mechanism may move the light guide plate unit in the depth direction in accordance with a detection result. That is, the light guide plate unit may be moved in conjunction with a movement of a player's hand moved in front of the light guide plate unit. Moving the light guide plate unit in accordance with the movement of the player's hand may allow the player to experience surprise and play the game more enjoyably, which may attract more interest of the player.

In addition, by adding movement presentation by movement of the light guide plate unit to the light presentation by the light guide plate, a range of presentation may be expanded, which may also attract more interest of the player.

An illumination device according to one or more embodiments may further have a configuration in which the light guide plate unit has a plurality of the light guide plates, the plurality of light guide plates are arranged at a predetermined interval in a depth direction, and the light projecting unit is arranged at a side of the light guide plate unit and has an optical element of an amount for one piece among the plurality of light guide plates. In the above described configuration, the moving mechanism may move the light guide plate unit to cause the light incident surface of any one light guide plate in the plurality of light guide plates to be opposed to the light projecting unit.

According to the above described configuration, the moving mechanism may move the light guide plate unit in a depth direction to cause the light incident surface of any one light guide plate in the plurality of light guide plates to be opposed to the light projecting unit, and may illuminate the light guide plate that is arranged to be opposed. That is, by providing the light projecting unit having the optical element separately from the light guide plate and moving the light guide plate unit, the light projecting unit having the optical element of an amount for one light guide plate may be shared by the plurality of light guide plates.

In the configuration in which the optical element is arranged on the light incident surface of the light guide plate, an optical element of an amount for the number of light guide plates may be required. Therefore, as a size of the light guide plate increases, the number of optical elements required for each piece may increase, resulting in higher cost. However, the above described configuration may significantly reduce the number of required optical elements and reduce cost. In principle, any number of light guide plates may be illuminated by an optical element of an amount for one piece.

An illumination device according to one or more embodiments may further have a configuration in which the moving mechanism has a voice coil motor as a drive source. In the above described configuration, as a holding member configured to hold the voice coil motor, there are provided a fixed-side holder configured to hold a fixed portion of the voice coil motor and fixed to the base, and a movable-side holder configured to hold a movable portion of the voice coil motor and fixed to the light guide plate unit. Further, the fixed-side holder and the movable-side holder are slidably fitted to each other, and the light guide plate unit is movably supported by the fixed-side holder and the movable-side holder.

According to the above described configuration, the fixed-side holder and the movable-side holder, which are holding members to hold the voice coil motor, may support the light guide plate unit movably in the depth direction, which may enable a guiding mechanism for reciprocation of the light guide plate unit to be easily realized.

An illumination device according to one or more embodiments may further have a configuration in which the moving mechanism has a coil spring. In the above described configuration, the coil spring is sandwiched between the fixed-side holder and the movable-side holder, is compressed or expanded as the movable portion of the voice coil motor moves, and is configured to restore to move the light guide plate unit to a predetermined position and hold when the voice coil motor is not energized. Accordingly, the light guide plate unit may be allowed to be held at a predetermined position when the voice coil motor is not energized.

An illumination device according to one or more embodiments may further have a configuration in which the light guide plate unit, the light projecting unit, and the moving mechanism constitute an illuminator, and a plurality of the illuminators are arranged side by side on the base. Accordingly, a presentation may be enabled in which the illuminators are combined rather than a configuration with one illuminator, and in which a wider range is provided.

A game machine according to one or more embodiments may include: a game machine main body; and the illumination device according to one or more aspects of the present disclosure installed to face a side opposed to a player, in the game machine main body.

According to one or more embodiments, it may be possible to realize an illumination device that is more appealing and can attract players more.

DETAILED DESCRIPTION

Hereinafter, one or more embodiments relating to an aspect or aspects of the present disclosure will be described with reference to the drawings. In one or more embodiments, as one or more aspects of an illumination device of the present disclosure, a configuration in which the illumination device is mounted on a game machine such as a slot machine is exemplified.

§ 1 Application Example

Figure 1:
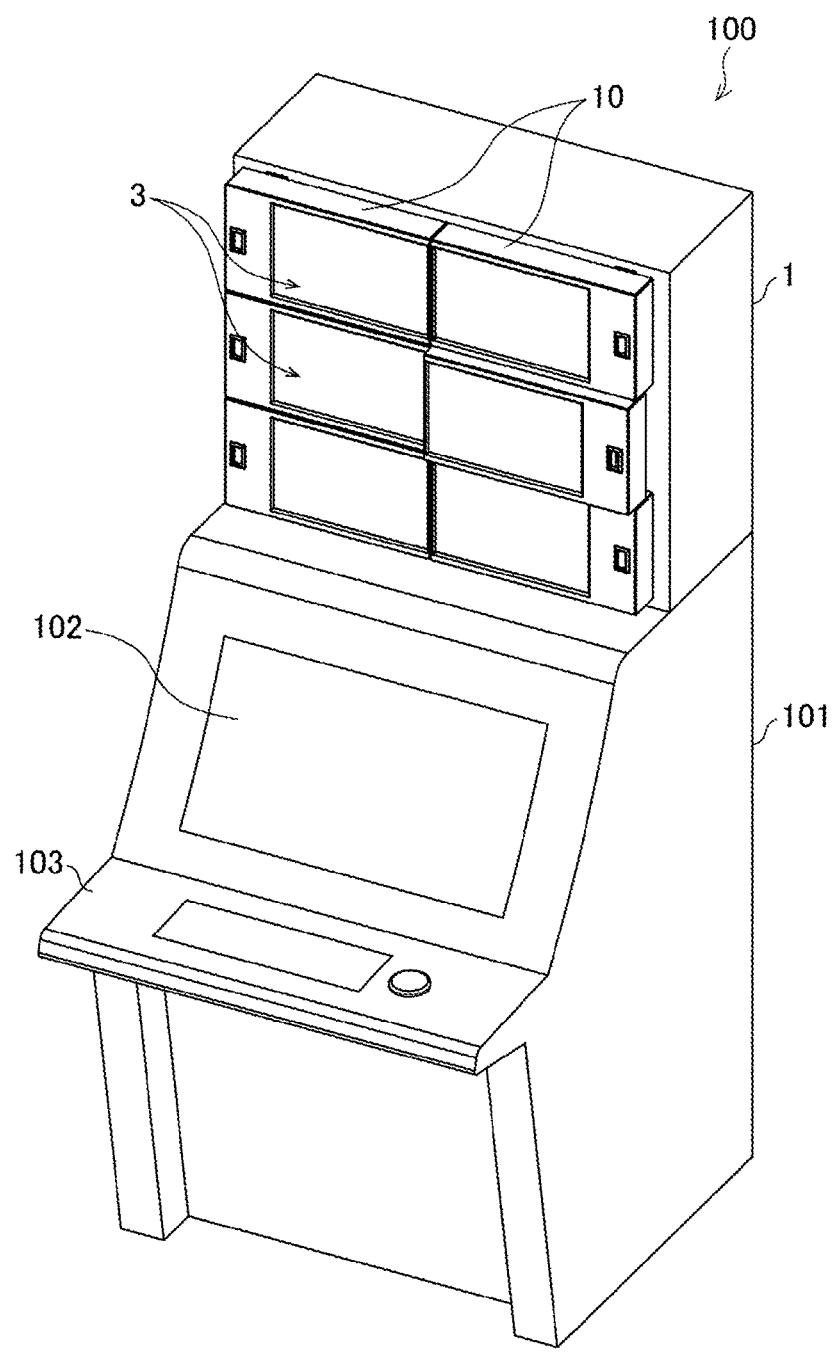
FIG. 1 is a diagram illustrating a perspective view of a slot machine mounted with an illumination device according to one or more embodiments.
Figure 2:
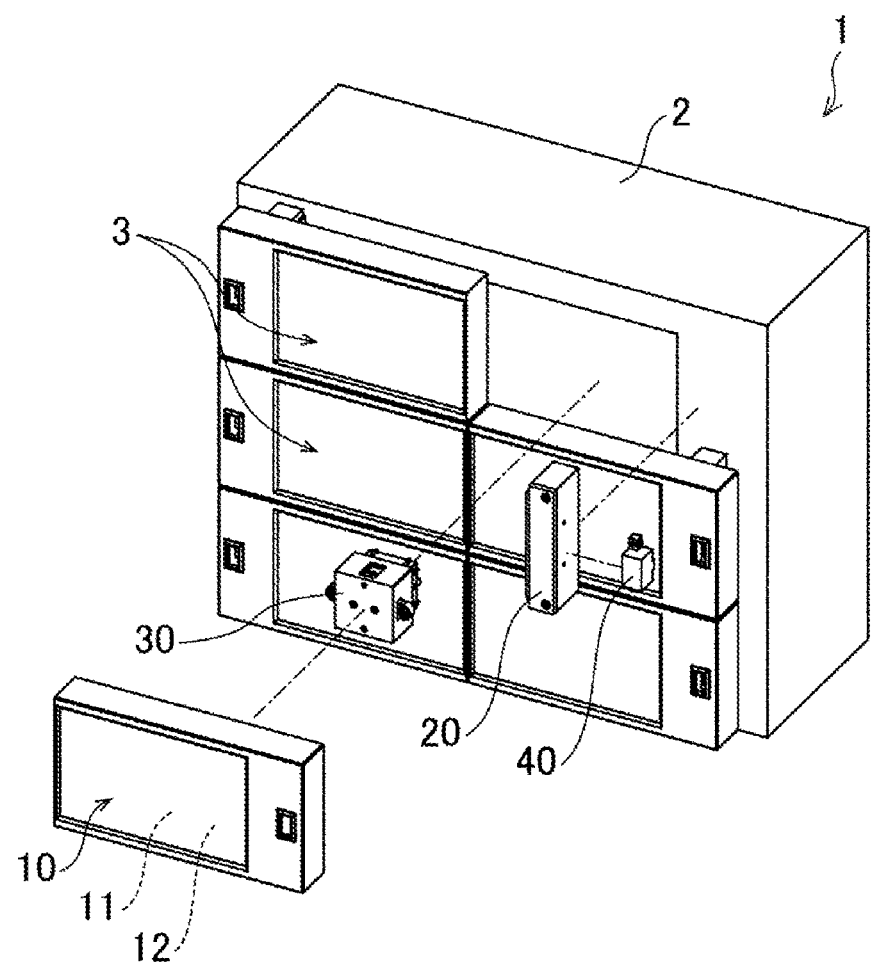
FIG. 2 is a diagram illustrating an explanatory view of a configuration of an illumination device, in which one illuminator is disassembled and shown.

As shown in FIG. 1, an illumination device 1 can be mounted on a game machine such as a slot machine 100. The illumination device 1 includes one or more illuminators 3 including a light guide plate unit 10. As shown in FIG. 2, the illuminator 3 includes the light guide plate unit 10, a light projecting unit 20, a moving mechanism 30, and a detector 40, and is supported by a base 2.

The light guide plate unit 10 has a front light guide plate 11 and a rear light guide plate 12 arranged aligned in a depth direction. The light projecting unit 20 projects light to a light guide plate of the light guide plate unit 10. The moving mechanism 30 moves the light guide plate unit 10 in a front-rear direction, which is the depth direction, and causes either the front light guide plate 11 or the rear light guide plate 12 to be opposed to the light projecting unit 20.

Figure 3:
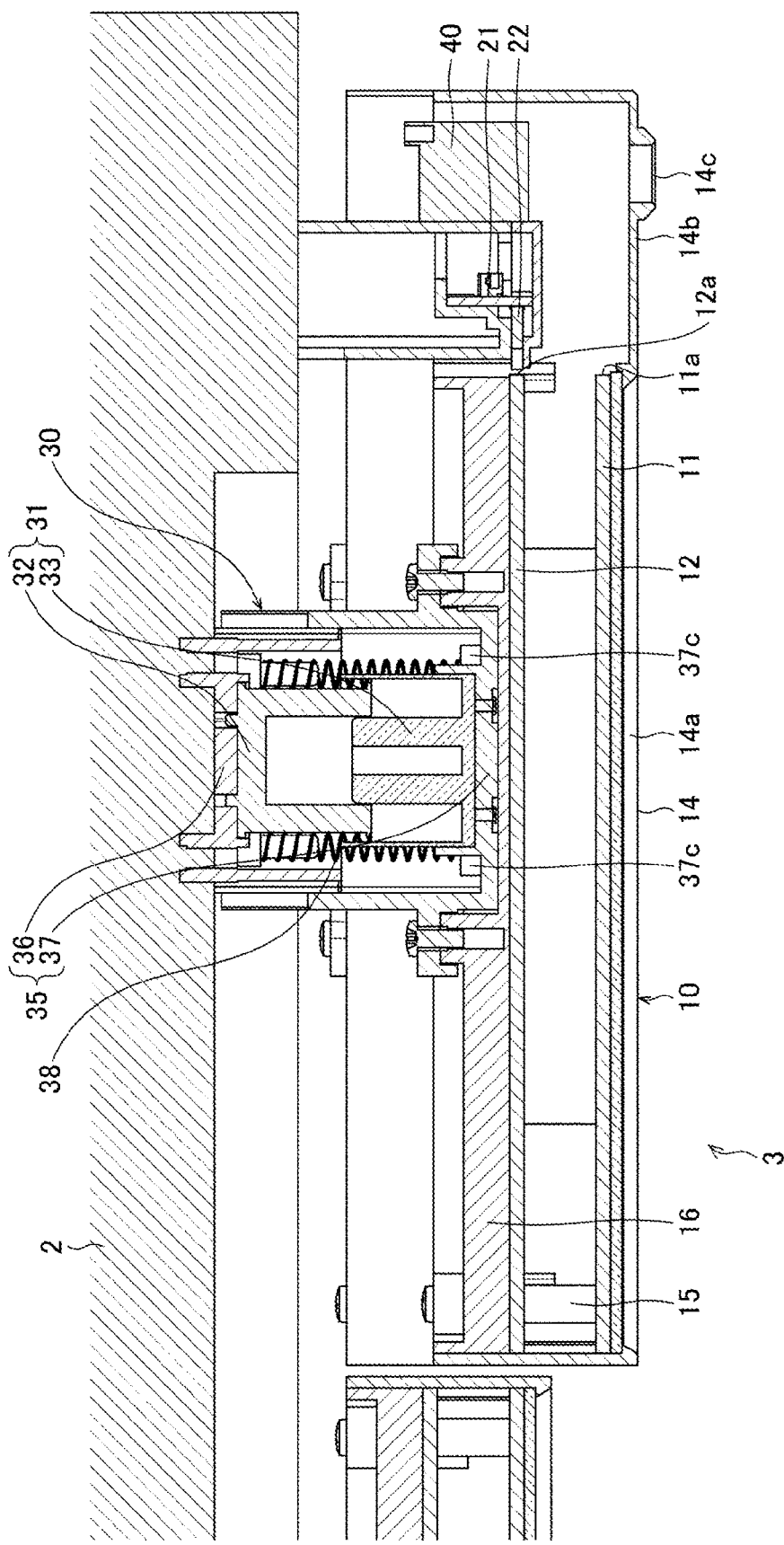
FIG. 3 is a diagram illustrating a transverse cross-sectional view of an illuminator in an illumination device, showing a state where a light guide plate unit is in a front position.
Figure 4:
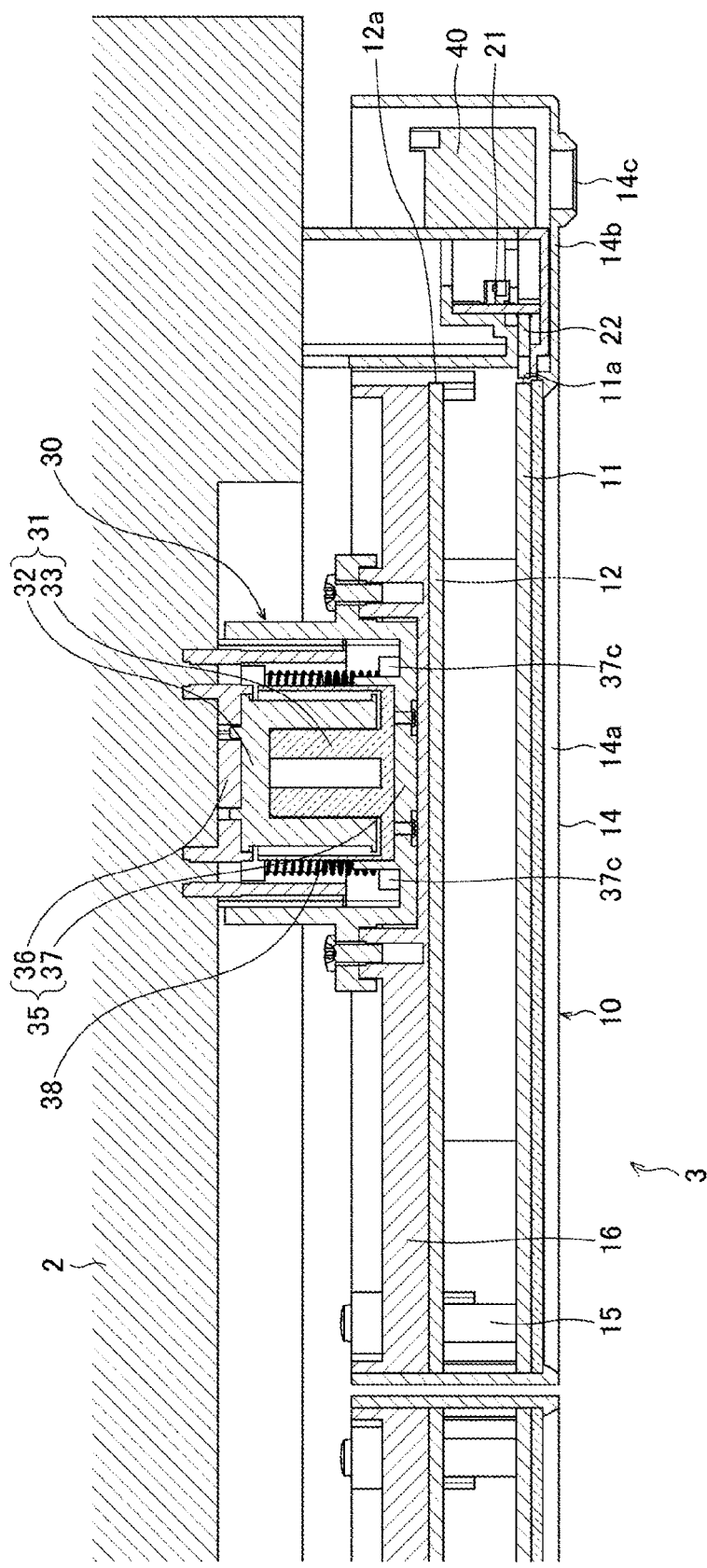
FIG. 4 is a diagram illustrating a transverse cross-sectional view of an illuminator in an illumination device, showing a state where a light guide plate unit is in a rear position.

As shown in FIG. 4, in a state where the light guide plate unit 10 is in a rear position retracted rearward, the front light guide plate 11 is located side by side with the light projecting unit 20, and light from the light projecting unit 20 is supplied to the front light guide plate 11 to illuminate the front light guide plate 11. In the above described configuration, the rear light guide plate 12 is not illuminated and is in a transparent state. Whereas, as shown in FIG. 3, in a state where the light guide plate unit 10 is in a front position popped out forward, the rear light guide plate 12 is located side by side with the light projecting unit 20, and light from the light projecting unit 20 is supplied to the rear light guide plate 12 to illuminate the rear light guide plate 12. In the above described configuration, the front light guide plate 11 is not illuminated and is in a transparent state.

The detector 40 is a non-contact sensor having a detection region in front of the light guide plate unit 10, and detects the presence or absence of an object. The object to be detected is a hand of a player who plays with the slot machine 100.

When the detector 40 detects a hand of the player who plays with the slot machine 100, the moving mechanism 30 moves the light guide plate unit 10 retracted to the rear position so as to pop out to the front position. Note that the movement is not limited to that described above, and may be a movement in which the light guide plate unit 10 at the front position is retracted to the rear position. Further, reciprocation may be made in which the light guide plate unit 10 popped out to the front position is immediately retracted. In addition, the movement may be such that back-and-forth reciprocation is repeated a plurality of times.

Accordingly, in the illumination device 1, the light guide plate, which has been conventionally fixed and has not moved, moves in accordance with detection of a movement of the player's hand, which can give the player an impression or surprise that has not existed before, enabling an illumination device to have greater impact and appeal, to surprise and attract the player.

§ 2 Configuration Example (1. Slot Machine 100)

First, a schematic configuration of the slot machine 100 will be described with reference to FIG. 1. FIG. 1 is a perspective view of the slot machine 100 installed with the illumination device 1. As shown in FIG. 1, the slot machine 100 as a game machine includes a machine main body (a game machine main body) 101 and the illumination device 1 mounted above the machine main body 101. The machine main body 101 has a display monitor 102 at an upper part, and an operation unit 103 below the display monitor 102. The illumination device 1 is installed so as to face the player who plays with the slot machine 100, with respect to the machine main body 101. The illumination device 1 includes at least one illuminator 3 including the light guide plate unit 10. In the example of FIG. 1, six illuminators 3 are arranged side by side in vertical and horizontal directions.

(2. Schematic Configuration of Illumination Device 1)

Next, a schematic configuration of the illumination device 1 will be described with reference to FIGS. 2 to 4. FIG. 2 is an explanatory view showing a configuration of the illumination device 1, in which one illuminator 3 in disassembled and shown. FIG. 3 is a transverse cross-sectional view of the illuminator 3 in the illumination device 1, showing a state where the light guide plate unit 10 is in a front position. FIG. 4 is a transverse cross-sectional view of the illuminator 3 in the illumination device 1, showing a state where the light guide plate unit 10 is in the rear position.

As shown in FIG. 2, the illumination device 1 has the base 2 constituting the entire illumination device 1 and attached to the machine main body 101. A plurality of illuminators 3 are provided on a front surface of the base 2. Each of the illuminators 3 has the light guide plate unit 10, the light projecting unit 20, the moving mechanism 30, and the detector 40.

As shown in FIGS. 3 and 4, the light guide plate unit 10 has the front light guide plate 11 and the rear light guide plate 12 that are arranged to be opposed each other at a predetermined interval. The front light guide plate 11 and the rear light guide plate 12 are arranged in a depth direction at a predetermined interval. The front light guide plate 11 is located in front, and the rear light guide plate 12 is located behind the front light guide plate 11.

The light projecting unit 20 has an LED board 21, projects light to the light guide plate unit 10, and is arranged at a side of the light guide plate unit 10. The front light guide plate 11 and the rear light guide plate 12 are illuminated (lit) by light being supplied from the light projecting unit 20 to the inside.

The moving mechanism 30 is arranged behind the light guide plate unit 10, and moves the light guide plate unit 10 in the depth direction with respect to the base 2. In the embodiment, since the illumination device 1 is installed so as to face a side opposed to the player who plays with the slot machine 100, the depth direction is the front-rear direction. Further, in the embodiment, the moving mechanism 30 has a voice coil motor 31 as a drive source. The light guide plate unit 10 reciprocates between a front position projected forward as shown in FIG. 3 and the rear position retracted rearward as shown in FIG. 4, by the moving mechanism 30.

As shown in FIG. 3, when the light guide plate unit 10 is in the front position, a light incident surface 12a of the rear light guide plate 12 and a lens unit 22 described later of the light projecting unit 20 are opposed to each other, and light is supplied to the inside of the rear light guide plate 12 to illuminate the rear light guide plate 12. Whereas, as shown in FIG. 4, when the light guide plate unit 10 is in the rear position, a light incident surface 11a of the front light guide plate 11 and the lens unit 22 of the light projecting unit 20 are opposed to each other, and light is supplied to the inside of the front light guide plate 11 to illuminate the front light guide plate 11.

The detector 40 is a non-contact sensor configured to detect the presence or absence of an object without contacting, and has the detection region in front of the light guide plate unit 10. In the embodiment, the detector 40 is attached to a side surface of the light projecting unit 20. The light projecting unit 20, the moving mechanism 30, and the detector 40 are fixed to the base 2, and the light guide plate unit 10 alone is movable with respect to the base 2.

In addition, as shown in FIG. 2, when two illuminators 3 are arranged side by side in a left-right direction, the light projecting unit 20 and the detector 40 of each illuminator 3 are arranged on an outer edge side. Therefore, seams of the two illuminators 3 arranged side by side are inconspicuous.

(3. Light Guide Plate Unit 10)

Figure 5:
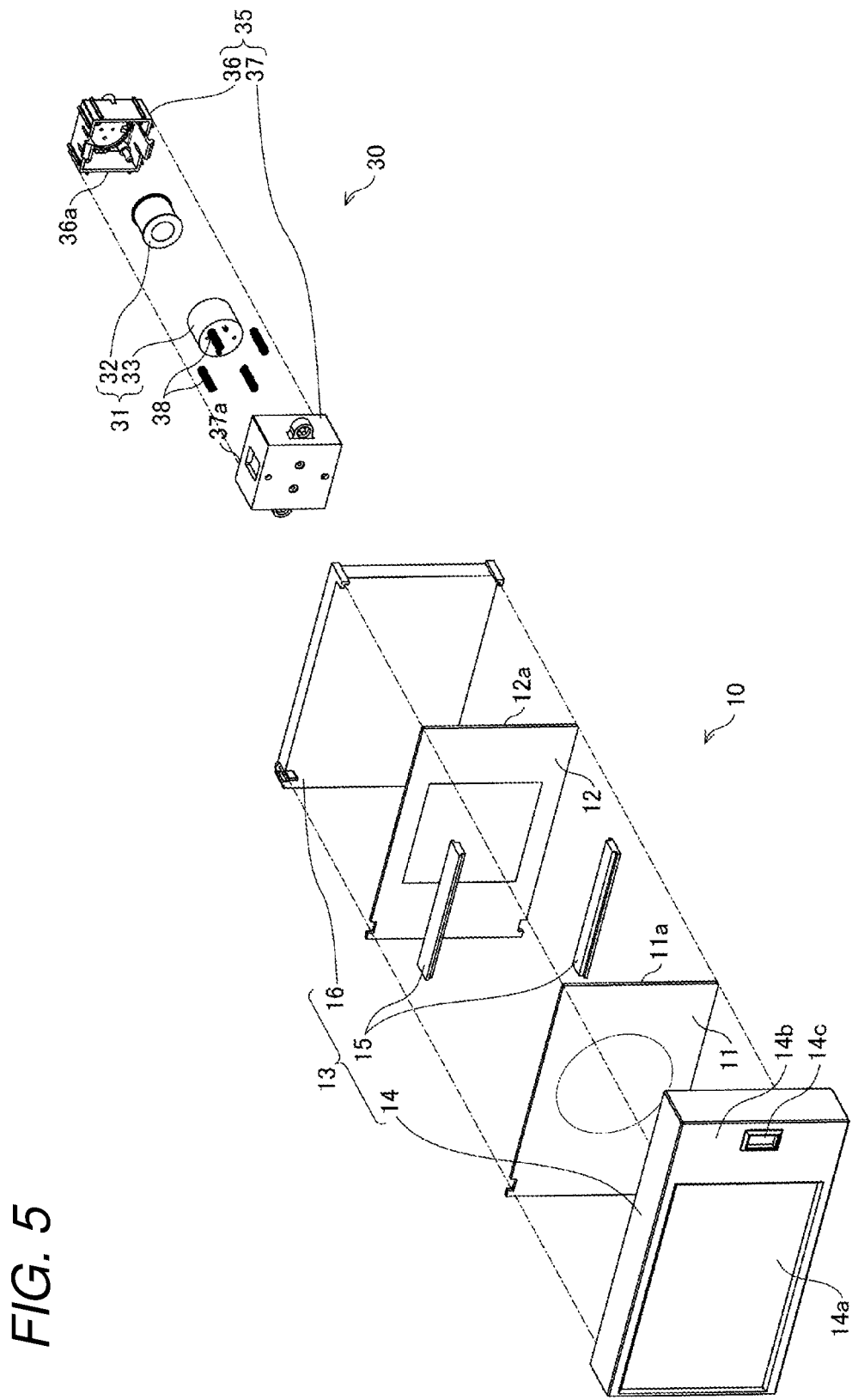
FIG. 5 is a diagram illustrating an exploded perspective view of a light guide plate unit and a moving mechanism in an illuminator.

Next, a configuration of the light guide plate unit 10 will be described with reference to FIG. 5. FIG. 5 is an exploded perspective view of the light guide plate unit 10 and the moving mechanism 30 in the illuminator 3. As shown in FIG. 5, the light guide plate unit 10 has the front light guide plate 11 and the rear light guide plate 12 described above, and a light guide plate holder 13 configured to hold the front light guide plate 11 and the rear light guide plate 12. The light guide plate holder 13 includes a light guide plate holding cover 14, a spacer 15, and a light guide plate holding case 16, and holds the front light guide plate 11 and the rear light guide plate 12 at a predetermined interval. In the embodiment, the light guide plate unit 10 has a rectangular shape as an example, in which the front light guide plate 11, the rear light guide plate 12, the light guide plate holding cover 14, and the light guide plate holding case 16 are formed in a rectangular shape.

The front light guide plate 11 and the rear light guide plate 12 are plate-shaped members made of transparent polycarbonate, acrylic resin, or the like, and having a thickness of about 2 mm. On individual back surfaces of the front light guide plate 11 and the rear light guide plate 12, different designs and patterns are drawn with unevenness. In the example of FIG. 5, a circular pattern is drawn on the front light guide plate 11, and a quadrangular pattern is drawn on the rear light guide plate 12. Respective end surfaces of the front light guide plate 11 and the rear light guide plate 12 in a thickness direction (same in the depth direction) serve as the light incident surface 11a and the light incident surface 12a. In a configuration provided with a plurality of illuminators 3, the patterns of the front light guide plate 11 and the rear light guide plate 12 may be different for every illuminator 3.

When light from the light projecting unit 20 is incident inside the front light guide plate 11 from the light incident surface 11a, the incident light travels while repeating regular reflection between a front light exit surface and a back surface having unevenness. During that time, the light incident on the unevenness of the back surface is reflected by the unevenness and emitted from the light exit surface to illuminate, and the circular pattern drawn with unevenness emerges. Similarly, the rear light guide plate 12, and light from the light projecting unit 20 is incident inside from the light incident surface 12a to illuminate, and the quadrangular pattern drawn with unevenness emerges.

By applying the unevenness like a mosaic on the back surface of each of the front light guide plate 11 and the rear light guide plate 12 as a whole or on the entire back surface, it is also possible to illuminate the entire front light guide plate 11 and rear light guide plate 12 with a color of the light supplied from the light projecting unit 20.

The spacer 15 is a member to maintain a predetermined interval between the front light guide plate 11 and the rear light guide plate 12, and is arranged in a pair at upper and lower ends that are difficult to see, between the front light guide plate 11 and the rear light guide plate 12.

The light guide plate holding cover 14 protects the front light guide plate 11 and the rear light guide plate 12, and also has a function of covering a front side of the light projecting unit 20 to make it difficult to see the light projecting unit 20 and a periphery. In the light guide plate holding cover 14, a region 14a opposed to the front light guide plate 11 is formed to be transparent, and a front side portion 14b on a side where a peripheral edge and the light projecting unit 20 are arranged is formed to be opaque. On the front side portion 14b formed to be opaque, a detection window 14c of the detector 40 is formed.

Further, a reflective film is desirably provided on an inner surface of the peripheral edge of the light guide plate holding cover 14, on a surface where end surfaces of the front light guide plate 11 and the rear light guide plate 12 in the thickness direction are opposed to each other. The reflective film can be formed by forming a reflective material such as aluminum into a film by a manufacturing method such as plating or vapor deposition. Providing the reflective film allows light reaching ends of the front light guide plate 11 and the rear light guide plate 12 to be reflected and returned into the front light guide plate 11 and the rear light guide plate 12 again. Therefore, light of the light projecting unit 20 can be effectively used.

The light guide plate holding case 16 covers a rear surface of the light guide plate unit 10, and is attached with a movable-side holder 37 (described later) of the moving mechanism 30.

(4. Moving Mechanism 30)

Figure 6:
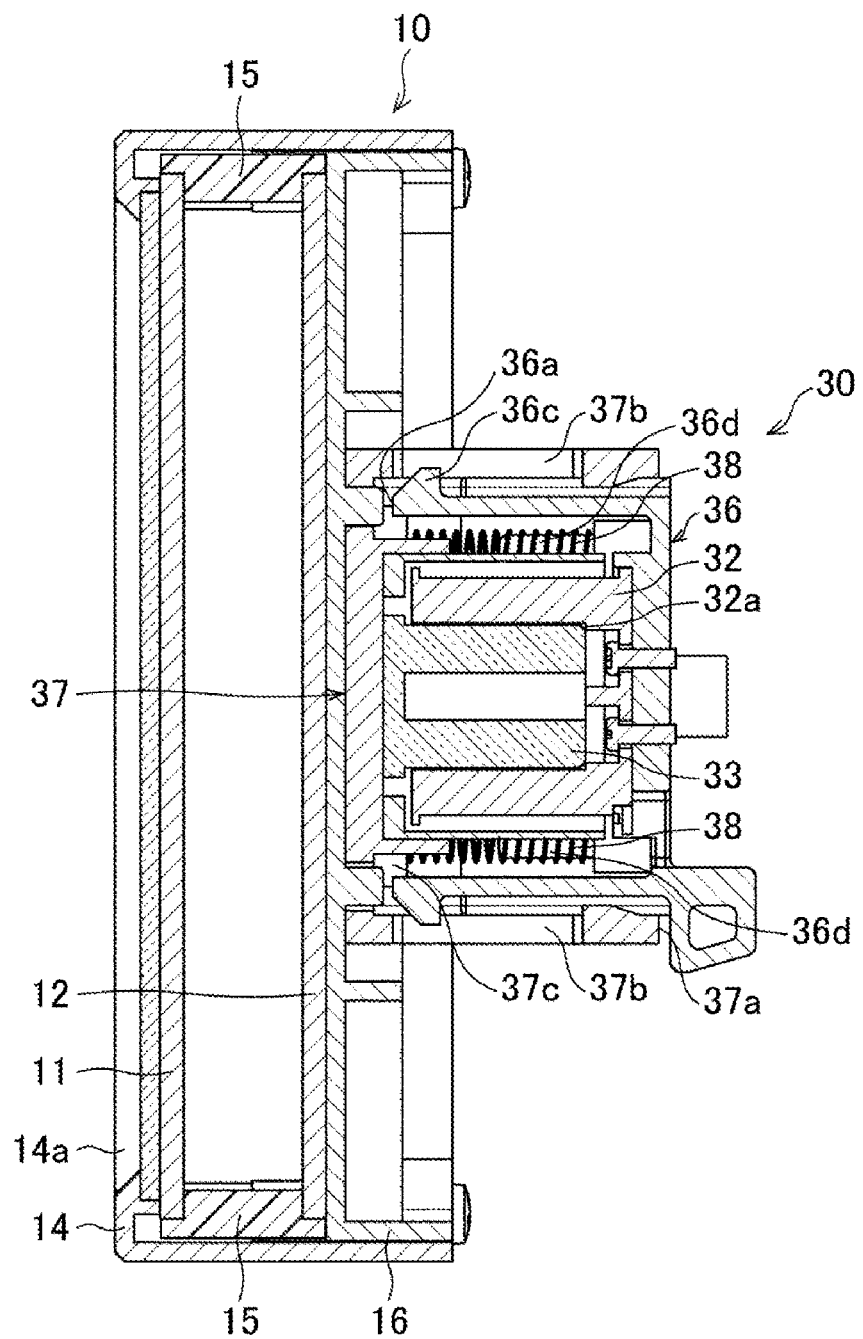
FIG. 6 is a diagram illustrating a vertical cross-sectional view of an illuminator, showing a state where a light guide plate unit is in a rear position.
Figure 7:
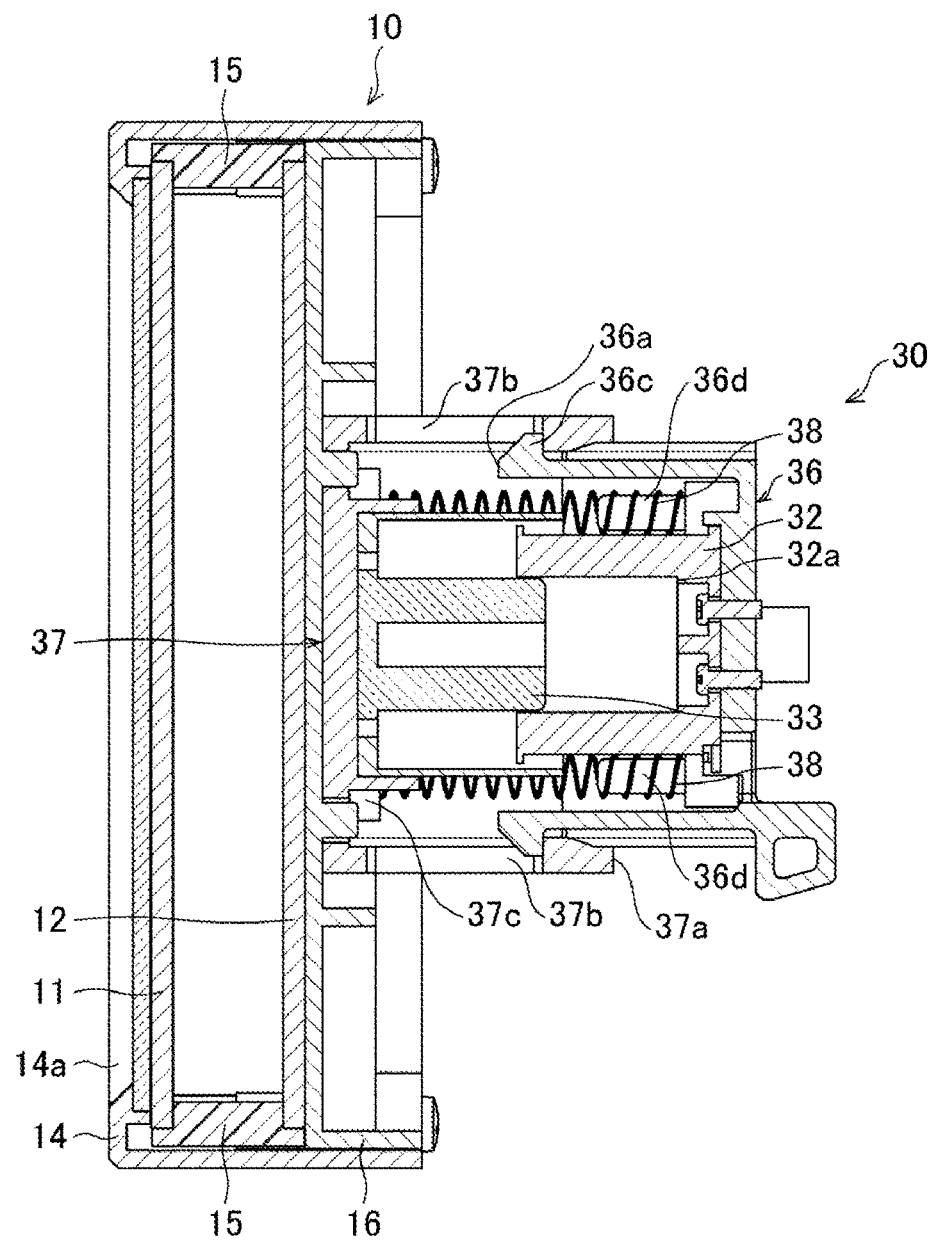
FIG. 7 is a diagram illustrating a vertical cross-sectional view of an illuminator, showing a state where a light guide plate unit is in a front position.
Figure 8:
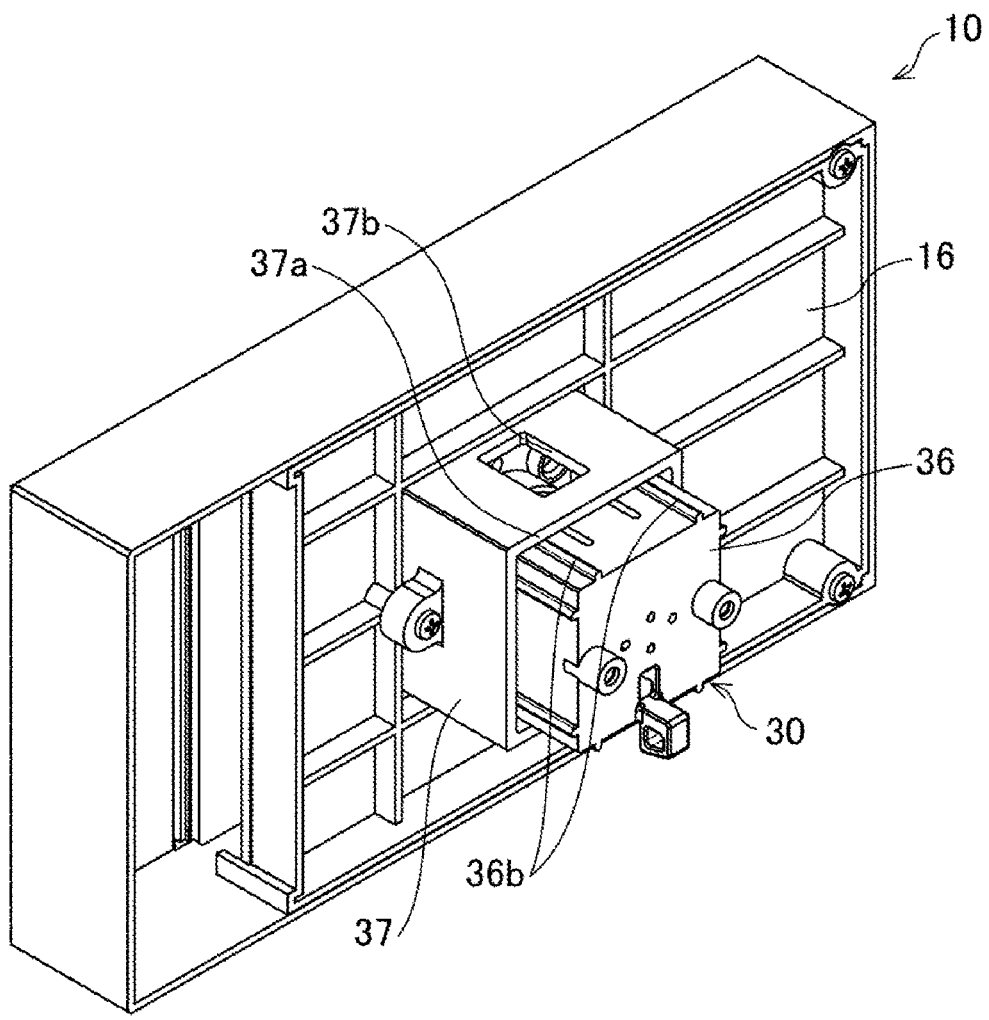
FIG. 8 is a diagram illustrating a perspective view showing a sliding structure of an illuminator when being movable by a VCM holder, and is viewed from a back surface side of a light guide plate unit.

Next, a configuration of the moving mechanism 30 will be described with reference to FIGS. 5, 6, 7, and 8. FIG. 6 is a vertical cross-sectional view of the illuminator 3 in the illumination device 1, showing a state where the light guide plate unit 10 is in the rear position. FIG. 7 is a vertical cross-sectional view of the illuminator 3 in the illumination device 1, showing a state where the light guide plate unit 10 is in the front position. Note that, in FIGS. 6 and 7, the description of the base 2 is omitted. FIG. 8 is a perspective view showing a sliding structure of the illuminator 3 when being movable by a VCM holder 35, and is viewed from a back surface side of the light guide plate unit 10.

As shown in FIGS. 5, 6, and 7, the moving mechanism 30 includes the voice coil motor 31 as a drive source, the VCM holder 35 configured to hold the voice coil motor 31, and a plurality of coil springs 38. The voice coil motor 31 has a fixed component 32 and a movable component 33 having a cylindrical shape, and a coil (not shown). The voice coil motor 31 switches a direction of a current flowing through the coil or cuts off the current, to cause the movable component 33 to reciprocate with respect to the fixed component 32. Hereinafter, the voice coil motor 31 will be referred to as a VCM 31. The VCM holder 35 is a voice coil motor holder 35.

The VCM holder 35 has a fixed-side holder 36 configured to hold the fixed component 32, and the movable-side holder 37 configured to hold the movable component 33. Among these, the fixed-side holder 36 is attached to and fixed to the base 2 (see FIG. 3), and the movable-side holder 37 is attached to a back surface of the light guide plate holding case 16 and fixed to the light guide plate unit 10. In the embodiment, the fixed-side holder 36 and the movable-side holder 37 are formed in a cube or rectangular parallelepiped box shape with one side open. The fixed component 32 and the movable component 33 are housed inside the fixed-side holder 36 and the movable-side holder 37 from openings 36a and 37a of the opened side, and respectively fixed to inner bottoms. The fixed-side holder 36 and the movable-side holder 37 are fitted such that the movable-side holder 37 is positioned outside the fixed-side holder 36, with the openings 36a and 37a opposed to each other.

As shown in FIGS. 6 and 7, a claw portion 36c is provided at an end on a side surface of the fixed-side holder 36 on the opening 36a side so as to protrude outward. In the embodiment, a pair of claw portions 36c is provided vertically. Then, a guide hole 37b into which the claw portion 36c enters is provided on upper and lower side walls of the movable-side holder 37.

As shown in FIG. 7, when the light guide plate unit 10 moves forward, the light guide plate unit 10 moves to and stops at a position where a rear end of the guide hole 37b of the movable-side holder 37 abuts against the claw portion 36c of the fixed-side holder 36. Further, as shown in FIG. 6, when the light guide plate unit 10 moves rearward, the light guide plate unit 10 moves to and stops at a position where a rear end of the movable component 33 held by the movable-side holder 37 abuts against a step 32a of the fixed component 32 held by the fixed-side holder 36. That is, the light guide plate unit 10 reciprocates between the front position and the rear position in the moving mechanism 30.

Further, in the embodiment, as shown in FIGS. 5, 6, and 7, a plurality of coil springs 38 are sandwiched between the movable-side holder 37 and the fixed-side holder 36. The coil spring 38 is arranged to restore the light guide plate unit 10 to the front position. Since the VCM 31 does not generate thrust when being not energized, the VCM 31 does not have ability to hold a position of the light guide plate unit 10 when the VCM is not energized. Therefore, the coil spring 38 is arranged so as to move the light guide plate unit 10 to the front position and hold by using a restoring force of the coil spring 38, when the VCM 31 is not energized. In the embodiment, a state where the light guide plate unit 10 is in the front position is a default of the illuminator 3.

In the embodiment, four coil springs 38 are provided. One ends of these coil springs 38 are inserted with spring supporters 36d provided at four inner corners of the fixed-side holder 36. At the corresponding four corners of an inner bottom of the movable-side holder 37, there are provided spring abutting parts 37c configured to abut against another ends of these coil springs 38 to compress the coil springs 38.

As shown in FIG. 6, the four coil springs 38 are pushed toward the spring abutting part 37c and compressed in a state where the light guide plate unit 10 is in the rear position, that is, in a state where the VCM 31 is pulling the movable component 33 toward the fixed component 32. When the VCM 31 is not energized, the coil spring 38 is restored to push the light guide plate unit 10 forward, and holds the position. As a result, even if power of the illumination device 1 is turned off and the VCM 31 is no longer energized, the position of the light guide plate unit 10 can be held at a predetermined position in the depth direction (the front position in the embodiment).

Further, as shown in FIG. 8, a plurality of sliding ribs 36b are provided on an outer side surface of the fixed-side holder 36, and these sliding ribs 36b and an inner side surface of the movable-side holder 37 are slidable. Having such a sliding structure enables smooth movement of the light guide plate unit 10, when the illuminator 3 is movable.

(5. Light Projecting Unit 20, Detector 40)

Figure 9:
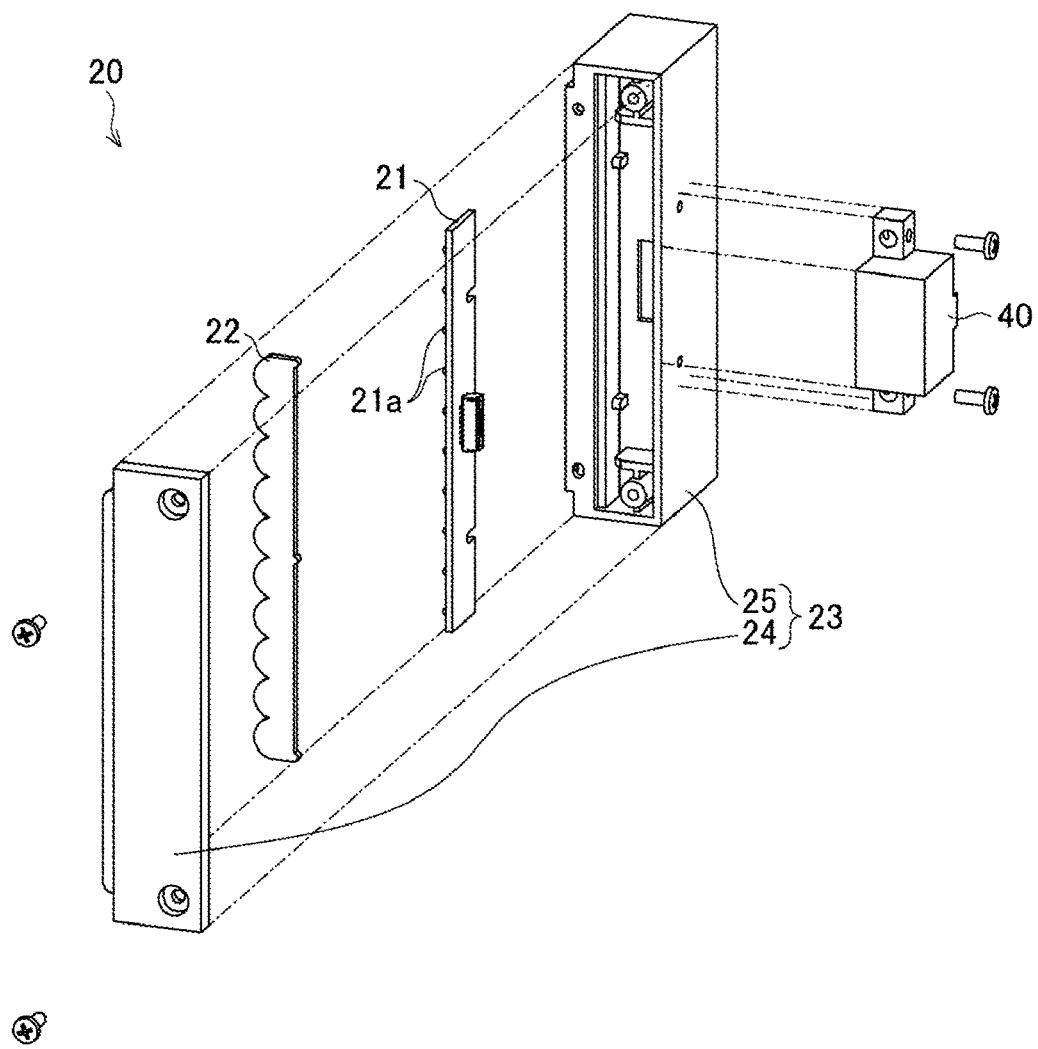
FIG. 9 is a diagram illustrating an exploded perspective view of a light projecting unit and a detector in an illuminator.

Next, configurations of the light projecting unit 20 and the detector 40 in the illumination device 1 will be described with reference to FIGS. 3, 4, and 9. FIG. 9 is an exploded perspective view of the light projecting unit 20 and the detector 40 in the illuminator 3.

As shown in FIG. 9, the light projecting unit 20 includes the LED board 21 on which a plurality of LEDs (optical elements) 21a serving as a light source are mounted, the lens unit 22, and an LED board holder 23. The LED board holder 23 holds the LED board 21 and the lens unit 22, and includes a board holding cover 24 and a board holding case 25. The board holding case 25 is attached to the base 2.

The LED board 21 has a plurality of LEDs 21a, and the plurality of LEDs 21a are mounted in a row on one surface of the LED board 21. The LED board 21 included in the light projecting unit 20 is of an amount for one light guide plate, and has the LEDs 21a of an amount to illuminate one light guide plate.

The lens unit 22 has a plurality of lenses that suppress diffusion of light emitted from the LED 21a, and is arranged so that the plurality of LEDs 21a and a light incident surface are opposed to each other. A light exit surface of the lens unit 22 is exposed from a gap formed between the board holding cover 24 and the board holding case 25. When directivity of the LED 21a is high, the lens unit 22 can be omitted.

As shown in FIG. 3, when the light guide plate unit 10 is in the front position, the light incident surface 12a of the rear light guide plate 12 is located at a position opposed to the light exit surface of the lens unit 22. Accordingly, light of the plurality of LEDs 21a is caused to be incident on the rear light guide plate 12, to illuminate the rear light guide plate 12.

Whereas, as shown in FIG. 4, when the light guide plate unit 10 is in the rear position, the light incident surface 11a of the front light guide plate 11 is located at a position opposed to the light exit surface of the lens unit 22. Accordingly, light of the plurality of LEDs 21a is caused to be incident on the front light guide plate 11, to illuminate the front light guide plate 11.

The detector 40 is, for example, a reflection sensor. As shown in FIG. 9, in the embodiment, the detector 40 is attached to a side surface of the board holding case 25 of the light projecting unit 20. When the detector 40 detects the presence of an object, the detector 40 transmits a signal notifying that the object has been detected, to an IC board 5 described later (see FIG. 10).

(6. Control System of Illumination Device 1)

Figure 10:
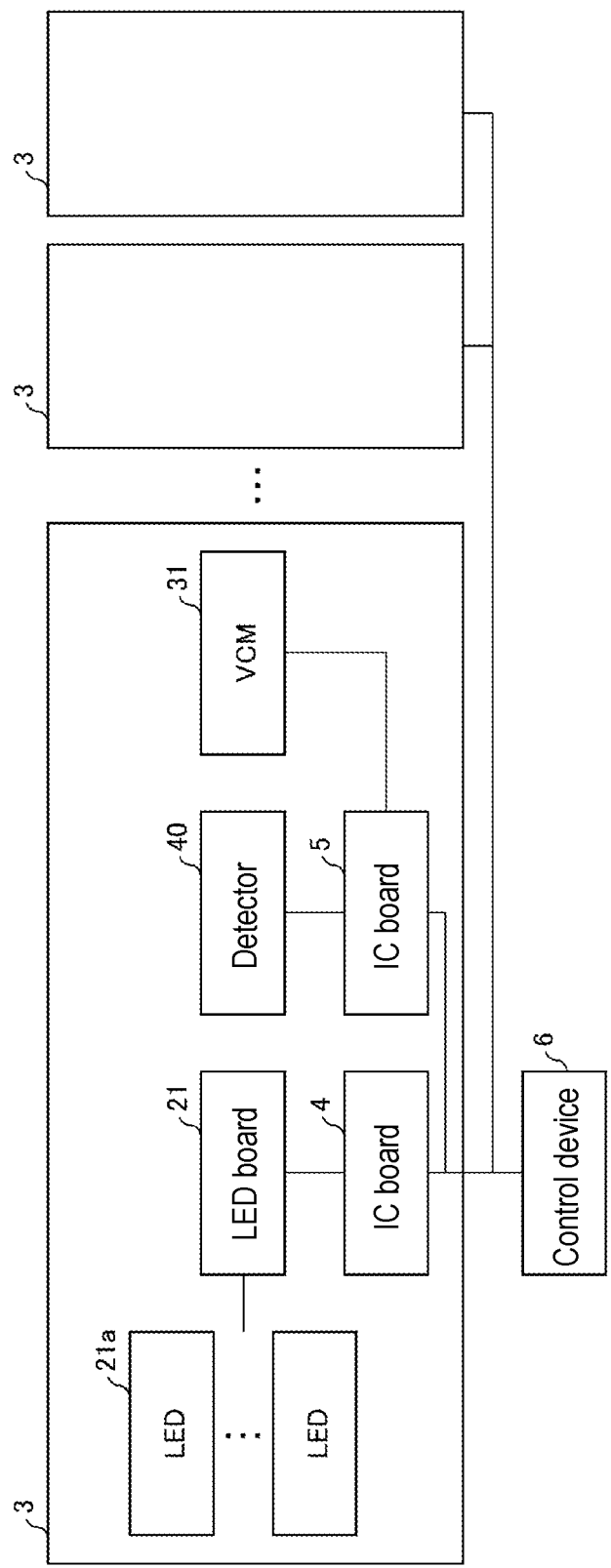
FIG. 10 is a block diagram illustrating an example of a control system of an illumination device.

Next, a control system in the illumination device 1 will be described with reference to FIG. 10. FIG. 10 is a block diagram of an example of the control system of the illumination device 1. As shown in FIG. 10, the illumination device 1 has IC boards 4 and 5 for every illuminator 3. The IC board 4 is connected with the LED board 21 on which a plurality of LEDs 21a are mounted. The IC board 4 controls ON, OFF, color development, light emission timing, brightness, and the like of the plurality of LEDs 21a, to execute light presentation of the illuminator 3. The VCM 31 and the detector 40 are connected with the IC board 5. The IC board 5 drives the VCM 31 to move the light guide plate unit 10, to execute movement presentation of the illuminator 3. Then, as one of the presentation, when the detector 40 detects an object, the IC board 5 controls the moving mechanism 30 to move the light guide plate unit 10 in accordance with a detection result. For example, when the detector 40 detects an object, the light guide plate unit 10 is popped out forward. Although the configuration in which the IC boards 4 and 5 are provided for every illuminator 3 is exemplified, a configuration may be adopted in which one of the IC boards 4 and 5 is used in the plurality of illuminators 3. Further, the IC boards 4 and 5 are provided separately, but may be configured by one IC board.

Further, the IC boards 4 and 5 of each illuminator 3 are connected to a control device 6. The control device 6 may be a control device provided in the machine main body 101 of the slot machine 100, or may be a control device installed in an amusement park where the slot machine 100 is installed. Accordingly, light presentation and movement presentation associated with a game content and a game situation in the machine main body 101 are enabled.

(7. Presentation and Effect of Illumination Device 1)

Figure 11:
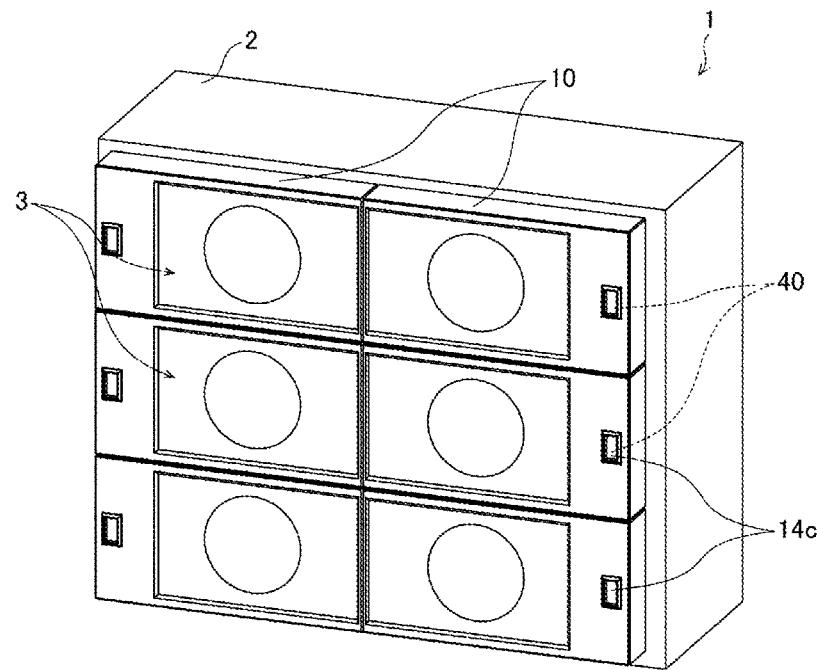
FIG. 11 is a diagram illustrating an explanatory view of a presentation scene of an illumination device, showing a state where illuminators are all in a rear position.
Figure 12:
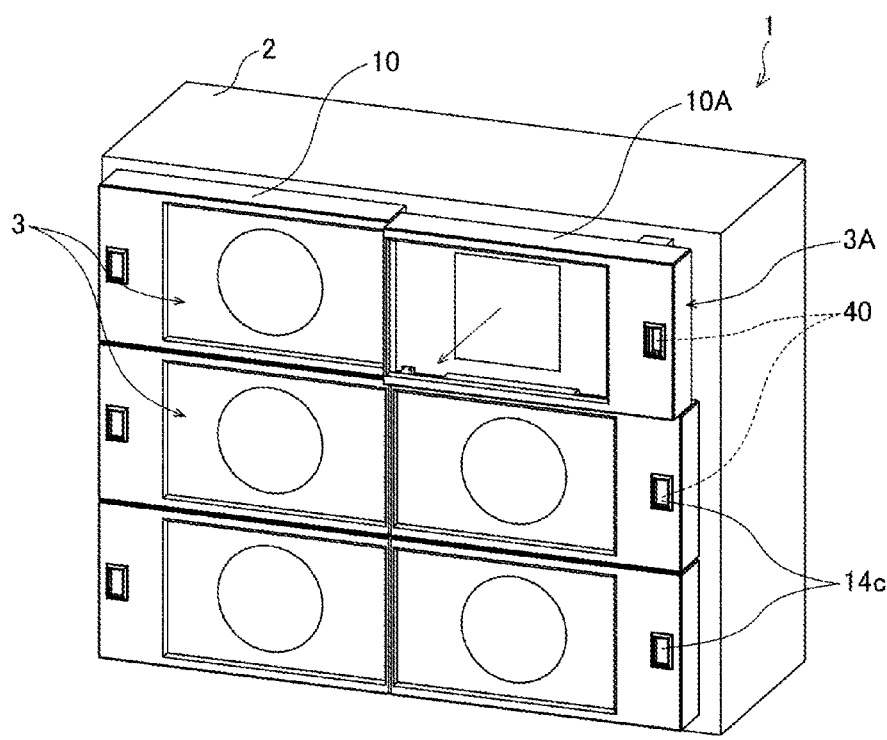
FIG. 12 is a diagram illustrating an explanatory view of a presentation scene of an illumination device, showing a state where one illuminator is popped out to a front position.

Next, presentation of the illumination device 1 will be described with reference to FIGS. 11 and 12. FIGS. 11 and 12 are explanatory views showing a scene of the presentation of the illumination device 1. FIG. 11 shows a retracted state where the plurality of illuminators 3 are all in the rear position. FIG. 12 shows a state where one of the plurality of illuminators 3 is popped out to a front position.

As shown in FIG. 11, in the illuminator 3 with the light guide plate unit 10 in the rear position, the light incident surface 11a of the front light guide plate 11 and the lens unit 22 of the light projecting unit 20 are opposed to each other. Then, the front light guide plate 11 is illuminated, and a circular pattern drawn on the front light guide plate 11 emerges (see FIGS. 4 and 5). Until the detector 40 detects a player's hand, the illumination device 1 waits at the retracted position shown in FIG. 11.

As shown in FIG. 12, in such a state, when a player's hand approaches, for example, near the detection window 14c of an uppermost illuminator 3A on a right side, the detector 40 of the illuminator 3A detects the player's hand, and the light guide plate unit 10A of the illuminator 3A moves forward. In the illuminator 3A with the light guide plate unit 10 in the front position, the light incident surface 12a of the rear light guide plate 12 and the lens unit 22 of the light projecting unit 20 are opposed to each other. Then, the rear light guide plate 12 is illuminated, and a square pattern drawn on the rear light guide plate 12 emerges (see FIGS. 3 and 5). That is, by popping out forward, the displayed pattern of the illuminator 3 changes. The popped light guide plate unit 10A may move back to the rear position immediately after popping out, or may move back at a time when the detector 40 no longer detects the hand. Since the light guide plate unit 10 moves in accordance with detection of the movement of the player's hand, it is possible to give the player an impression or surprise that has not existed before, enabling an illumination device to have greater impact and appeal, to surprise and attract the player.

The number of illuminators 3 may be one, but arranging a plurality of illuminators 3 enables presentation that is more interesting and has a wider range than the case of one illuminator 3. A plurality of illuminators 3 so arranged can attract interest of not only the player but also people around the player.

Further, according to the above described configuration, the light guide plate unit 10 and the light projecting unit 20 are separated, and the moving mechanism 30 moves the light guide plate unit 10 in the depth direction to cause either one of the front light guide plate 11 and the rear light guide plate 12 to be opposed to the light projecting unit 20, to be illuminated. That is, two light guide plates, the front light guide plate 11 and the rear light guide plate 12, share the LED board 21 on which the LEDs 21a of an amount for one light guide plate are mounted. The above described configuration makes it possible to display different patterns using two light guide plates, while enabling reduction of the number of required LED boards 21, that is, the LEDs 21a, to reduce cost.

Further, as described above, the moving mechanism 30 is provided with the VCM 31 as a drive source, and can move the light guide plate unit 10 by a control method of the VCM 31 at any speed from a high speed for popping out vigorously to a low speed for moving slowly.

Further, the moving mechanism 30 includes the coil spring 38 configured to restore the light guide plate unit 10 to the front position and hold the position, when the VCM 31 is not energized. The above described configuration allows the light guide plate unit 10 to be held at a predetermined position, when the VCM 31 is not energized.

Further, the VCM 31 is used as the drive source, and the light guide plate unit 10 is movably supported by the VCM holder 35. The above described configuration enables a guiding mechanism for reciprocation of the light guide plate unit 10 to be easily realized.

§ 3 Modified Example

Although one or more embodiments have been described in detail above, the above description is merely an example of the present invention in all respects. Needless to say, various improvements and modifications can be made without departing from the scope of the present invention. For example, the following changes can be made. In the following, the same reference numerals will be used for the same components as those in the above embodiment, and the same points as in the above embodiment will be omitted as appropriate. The following modified examples can be combined as appropriate.

In the above embodiment, the number of light guide plates provided to the light guide plate unit 10 is two, the front light guide plate 11 and the rear light guide plate 12, but may be three or more. In principle, any number of light guide plates can be illuminated by the LED board 21 of an amount for one piece. In a case of using three or more light guide plates, an actuator capable of switching a movement position in multiple stages may be used as the drive source of the moving mechanism 30.

Further, when a plurality of light guide plates are provided, there is an advantage that the LED board 21 can be reduced by separating the light projecting unit 20 from the light guide plate unit 10. However, when the number of the light guide plate is one, the LED board 21 may be arranged on a light incident surface of the light guide plate, mounted inside the light guide plate unit, and moved together with the light guide plate.

The reflective sensor is used as the detector 40, but any sensor that can detect the presence or absence of an object without contacting is sufficient. When the detector can detect a distance to an object, the light guide plate unit 10 can be moved back and forth as the player moves a hand back and forth in the depth direction.

Further, in the above embodiment, the state where the light guide plate unit 10 is in the front position is the default of the illuminator 3, but the state where the light guide plate unit 10 is in the rear position may be the default of the illuminator 3. In that case, a coil spring that extends with the light guide plate unit 10 in the front position may be arranged, and the light guide plate unit 10 may be moved to the rear position and held by a restoring force of the coil spring.

The present invention is not limited to one or more embodiments described, and various modifications can be made within the scope of the claims. Further, the technical scope of the present invention also includes embodiments obtained by appropriately combining the technical ideas disclosed in the different embodiments.

The invention claimed is:

1. An illumination device comprising:
   a light guide plate unit comprising a light guide plate configured to emit, from a light exit surface, light incident inside from a light incident surface;
   a light projecting unit comprising an optical element configured to supply light to the light guide plate;
   a moving mechanism configured to cause the light guide plate unit to reciprocate in a depth direction;
   a detector comprising a detection region in front of the light guide plate unit in the depth direction, the detector being configured to detect presence or absence of an object without contacting; and
   a base configured to support the light guide plate unit, the light projecting unit, the moving mechanism, and the detector, wherein
   the moving mechanism moves the light guide plate unit in accordance with a detection result of the detector.

2. The illumination device according to claim 1, wherein
   the light guide plate unit comprises a plurality of light guide plates, and the plurality of the light guide plates are arranged at a predetermined interval in a depth direction,
   the light projecting unit is positioned at a side of the light guide plate unit, and comprises an optical element of an amount for one piece among the plurality of the light guide plates, and
   the moving mechanism moves the light guide plate unit to cause the light incident surface of any one light guide plate in the plurality of the light guide plates to be opposed to the light projecting unit.

3. The illumination device according to claim 2, wherein
   the moving mechanism further comprises a voice coil motor as a drive source,
   a holding member configured to hold the voice coil motor, comprising:
      a fixed-side holder configured to hold a fixed portion of the voice coil motor and fixed to the base, and
      a movable-side holder configured to hold a movable portion of the voice coil motor and fixed to the light guide plate unit, wherein
   the fixed-side holder and the movable-side holder are slidably fitted to each other, and
   the light guide plate unit is movably supported by the fixed-side holder and the movable-side holder.

4. The illumination device according to claim 3, wherein
   the moving mechanism comprises a coil spring that is sandwiched between the fixed-side holder and the movable-side holder, the coil spring being compressed or expanded as the movable portion of the voice coil motor moves, and the coil spring being configured to restore to move the light guide plate unit to a predetermined position and hold in response to the voice coil motor is not energized.

5. The illumination device according to claim 2, wherein
   the light guide plate unit, the light projecting unit, and the moving mechanism constitute an illuminator, and
   a plurality of the illuminators are arranged side by side on the base.

6. A game machine comprising:
   a game machine main body; and the illumination device according to claim 2, which is installed to face a side opposed to a player, in the game machine main body.

7. The illumination device according to claim 1, wherein the moving mechanism further comprises a voice coil motor as a drive source, a holding member configured to hold the voice coil motor, comprising:
- a fixed-side holder configured to hold a fixed portion of the voice coil motor and fixed to the base, and
- a movable-side holder configured to hold a movable portion of the voice coil motor and fixed to the light guide plate unit, wherein the fixed-side holder and the movable-side holder are slidably fitted to each other, and the light guide plate unit is movably supported by the fixed-side holder and the movable-side holder.

8. The illumination device according to claim 7, wherein the moving mechanism comprises a coil spring that is sandwiched between the fixed-side holder and the movable-side holder, the coil spring being compressed or expanded as the movable portion of the voice coil motor moves, and the coil spring being configured to restore to move the light guide plate unit to a predetermined position and hold in response to the voice coil motor is not energized.

9. The illumination device according to claim 1, wherein the light guide plate unit, the light projecting unit, and the moving mechanism constitute an illuminator, and a plurality of the illuminators are arranged side by side on the base.

10. A game machine comprising:

a game machine main body; and the illumination device according to claim 1, which is installed to face a side opposed to a player, in the game machine main body.

* * * * *